June 12, 1956   H. W. BAQUE   2,749,666
METHOD OF FEEDING GLASS BATCH MATERIALS
Filed March 24, 1952
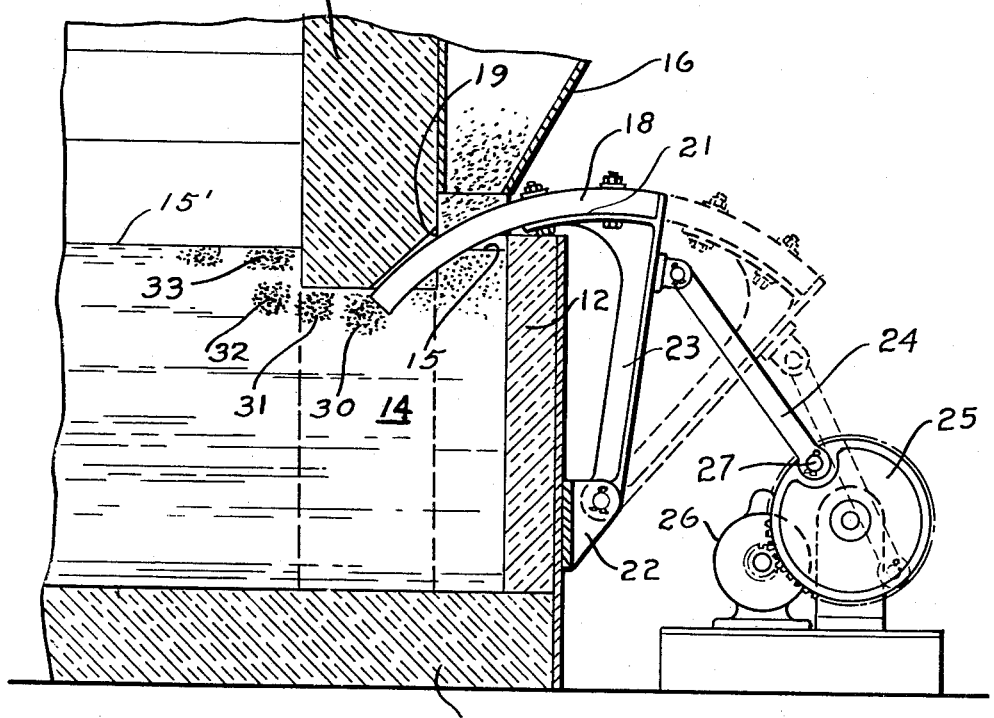
INVENTOR.
HAROLD W. BAQUE
BY Rolf E. Schneider
ATTORNEY.

2,749,666

METHOD OF FEEDING GLASS BATCH MATERIALS

Harold W. Baque, Pittsburgh, Pa., assignor to Corhart Refractories Company, Louisville, Ky., a corporation of Delaware Application March 24, 1952, Serial No. 278,268

1 Claim. (Cl. 49—77)

The present invention relates generally to a method of feeding batch materials to furnaces for melting the same and more particularly to a continuous-type glass-melting furnace having an associated glass batch feeder which employs a mechanically operated feeding member to introduce glass batch into the furnace beneath the normal level of the molten glass therein.

Glass-bath feeders generally employed in the past have in one fashion or another been designed to deposit and/or advance batch on and/or over the surface of the molten glass within a glass-melting furnace. A disadvantage of such feeding procedure, however, is that, when the batch is exposed to the flames passing back and forth over the molten glass within the furnace, a certain amount of sublimation and volatilization occurs, and finely divided substances in the batch also tend to be physically carried by the products of combustion into contact with the furnace walls and roof and through the checker block chambers of the furnace. Thus, these substances not only are lost from the batch, but additionally they exert a substantial corroding and fluxing action on the furnace walls and crown and checker blocks with the result that such structures wear away more rapidly than would otherwise be the case. Also these substances tend to clog the checker block chambers, thus shortening the life of the checker assemblies.

To avoid and overcome the foregoing objections it has been proposed to so design the batch-feeding equipment that the glass batch materials are introduced into the molten glass in the furnace at a location below the surface thereof and are thus enabled to become coated with molten glass before rising to the srface and being subjected to the flames within the furnace. The present invention is specifically directed to improvements in this latter form of batch-feeding practice.

An important object of the present invention is to provide a method of so feeding glass batch into a continuous-type glass-melting tank that the batch, upon submersion within the molten glass in the tank, is positively so maintained for a sufficient period of time to insure its becoming thoroughly covered and impregnated with liquid glass before its arrival at the surface of the molten glass, whereby loss of batch by volatilization and entrainment is eliminated or substantially minimized.

In one form of embodiment of the invention, such a glass-melting tank is provided at its glass batch-receiving end with a doghouse separated therefrom by the end wall of the tank but in communication therewith by way of a submerged throat or passage through such end wall. Mechanism is provided to push charges of glass batch materials, accumulated on the molten glass surface within the doghouse, down into the molten glass occupying the outer end of the passage between the doghouse and the glass-melting tank, where the batch materials are prevented from immediately rising to the surface by the section of the tank end wall defining the upper limit of such passage. The batch charges so fed are thus positively held below the surface of the molten glass and are progressively advanced by the introduction of succeeding batch charges until they finally emerge at the inner end of the passage and only then rise to the surface and become exposed to the action of the flames within the tank. As will be appreciated, during the period of their progressive advancement, the charges of batch materials are surrounded by hot molten glass which thoroughly coats and impregnates them before they are permitted to rise to the molten glass surface, by which time substantially no volatilizable or finely divided batch materials remain available for exposure to the flames.

In the accompanying drawing Fig. 1 is a fragmentary sectional plan view of the batch-receiving portion of a glass-melting furnace according to this embodiment of the invention; and Fig. 2 is a fragmentary sectional view taken generally along the line 2—2 of Fig. 1.

Referring to the drawing in detail numeral 11 designates the bottom wall of the tank of a glass-melting furnace, numeral 12 the end wall of a doghouse associated with such furnace, and numeral 13 the tank end wall, which is provided with a submerged passage 14 connecting the melting tank with the doghouse. Arranged above the top opening of the doghouse is a hopper 16 adapted to feed glass batch materials by gravity onto the surface 15 of the molten glass within the doghouse.

For the purpose of intermittently introducing accumulated batch materials from the surface of the molten glass within the doghouse into the melting tank through submerged passage 14, there is provided a pusher plate 18. As shown in the drawing, this plate is desirably arcuately shaped, in which case tank end wall 13 is recessed as at 19 to more conveniently accommodate the same. Plate 18 is attached to a short arm 21 on one end of a lever 23 pivotally mounted at its other end on a fixed support 22. Lever 23 intermediate its ends is pivotally connected to one end of a drive rod 24, the other end of which is pivotally attached at 27 to a drive wheel 25 adapted for rotation by a motor 26.

In the operation of the instant feeder the pusher plate 18 periodically oscillates between the position in which it is shown in full lines and the position in which it is shown in interrupted lines. As it moves from the interrupted-line position to the position shown, it advances a charge of glass batch materials 30, previously accumulated on the surface 15 of the molten glass within the doghouse, to the position indicated, thereby causing the previously fed batch charge 31 to be advanced toward the inner end of the passage 14. At the same time, the batch charge 32 is advanced beyond passage 14 and is thus freed for movement toward the surface 15' of the molten glass within the melting tank, the latter charge itself displacing an earlier fed batch charge 33 which, of course, moves forward within the tank as molten glass is withdrawn from the delivery end thereof.

Pusher plate 18 in advancing a charge of batch materials into the submerged passage 14 also serves as a gate to prevent accumulation of batch materials on the molten glass surface within the doghouse until such pusher plate recedes from under hopper 16. As plate 18 is withdrawn to its interrupted-line position, molten glass of course fills the void thereby created.

It should be understood that the furnace structure and feeder may take other forms than that illustrated. For example it may be desirable in some installations to thicken wall 13 so as to lengthen the time of holding the batch charges positively submerged. Additionally, it may be desirable under some circumstances to provide water cooling channels in the wall 13 and/or in the pusher plate 18. If the installation embodies a shallow depth tank, auxiliary electric heating of the molten glass in the doghouse through the use of submerged electrodes in known manner may conveniently be employed to insure maintenance of the desired fluidity of the molten glass.

Furthermore, as will be recognized, the instant procedure is not restricted to the employment of feeders of the intermittent type, since the pusher plate 18 can be replaced by a conventional screw feed arrangement, adapted to introduce the batch materials directly into submerged passage 14. With such continuous batch-feeding procedure, as within the intermittent set-up, the batch materials are advanced a predetermined horizontal distance with the body of molten glass after their introduction thereinto while they are positively maintained completely submerged and in contact with such molten glass and positively prevented from rising to the surface of the molten glass; and only after such horizontal advancement are the batch materials freed for movement vertically to the surface of the molten glass.

I claim:

The method of feeding glass batch materials into a pool of molten glass, which includes alternately accumulating charges of such materials on the surface of the pool and forcing such charges to a submerged position within the pool, progressively advancing each submerged charge a predetermined horizontal distance within the pool and positively maintaining each such submerged charge surrounded by molten glass and preventing it from rising to the pool surface during its advancement within the pool.

References Cited in the file of this patent

UNITED STATES PATENTS

| | | |
|---|---|---|
| 776,196 | Nicholls | Nov. 29, 1904 |
| 1,761,229 | Pederson | June 3, 1930 |
| 1,905,534 | Wadman | Apr. 25, 1933 |
| 1,999,761 | Howard | Apr. 30, 1935 |
| 2,397,852 | Gentil | Apr. 2, 1946 |
| 2,479,805 | Batchell | Apr. 23, 1949 |
| 2,471,336 | Lorenz | May 24, 1949 |